United States Patent
Cosgrove et al.

(10) Patent No.: US 10,875,386 B2
(45) Date of Patent: Dec. 29, 2020

(54) VARIABLE COMPRESSOR CONTROL FOR VEHICLE AIR CONDITIONING

(71) Applicant: Toyota Motor Engineering & Manufacturing North America, Inc., Erlanger, KY (US)

(72) Inventors: David W. Cosgrove, Royal Oak, MI (US); Hidekazu Hirabayashi, Ann Arbor, MI (US); Stefan Young, Ann Arbor, MI (US); Daniel B. Gidcumb, West Bloomfield, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 380 days.

(21) Appl. No.: 15/244,426

(22) Filed: Aug. 23, 2016

(65) Prior Publication Data

US 2018/0056753 A1  Mar. 1, 2018

(51) Int. Cl.
*B60H 1/00* (2006.01)
*B60H 1/32* (2006.01)

(52) U.S. Cl.
CPC ..... *B60H 1/3208* (2013.01); *B60H 2001/327* (2013.01); *B60H 2001/3266* (2013.01)

(58) Field of Classification Search
CPC ............ B60H 1/3208; B60H 2001/327; B60H 2001/3266; B60H 1/3205; B60H 1/00764
See application file for complete search history.

(56) References Cited

U.S. PATENT DOCUMENTS

| | | | |
|---|---|---|---|
| 5,893,272 A | 4/1999 | Hanselmann et al. | |
| 6,615,595 B2 | 9/2003 | Baruschke et al. | |
| 6,637,229 B1 | 10/2003 | Forrest et al. | |
| 6,672,085 B1 | 1/2004 | Sangwan et al. | |
| 6,978,628 B2 * | 12/2005 | Honda | B60H 1/004 62/134 |
| 7,721,563 B2 | 5/2010 | Takahashi et al. | |
| 7,861,547 B2 | 1/2011 | Major et al. | |
| 8,001,799 B2 | 8/2011 | Obayashi et al. | |
| 8,209,073 B2 | 6/2012 | Wijaya et al. | |
| 8,467,936 B2 | 6/2013 | Wijaya et al. | |
| 8,893,517 B2 * | 11/2014 | Madhavan | B60H 1/00764 62/56 |

(Continued)

*Primary Examiner* — Travis C Ruby
*Assistant Examiner* — Harry E Arant
(74) *Attorney, Agent, or Firm* — Christopher G. Darrow; Darrow Mustafa PC

(57) ABSTRACT

A vehicle heating, ventilating, and air conditioning (HVAC) system having a variable compressor can reduce a load applied to a vehicle powertrain during certain conditions. Systems and methods can determine if a power state of an HVAC system is activated, and whether an engine water temperature meets a forced HVAC recirculation intake threshold. Responsive to determining that the engine water temperature meets the forced HVAC recirculation intake threshold, a recirculation mode air source can be selected for the HVAC system. Responsive to the recirculation mode air source being selected, determining if at least one measured vehicle condition meets predetermined criteria. Responsive to determining that the at least one measured vehicle condition meets the predetermined criteria, the variable compressor can be operated according to a reduced duty map.

4 Claims, 5 Drawing Sheets

(56) References Cited

U.S. PATENT DOCUMENTS

| | | |
|---|---|---|
| 9,150,132 B2 | 10/2015 | Hoke et al. |
| 2008/0034767 A1* | 2/2008 | Ziehr .................. B60H 1/00385 62/180 |
| 2013/0074529 A1 | 3/2013 | Rollinger et al. |
| 2013/0283827 A1 | 10/2013 | Wang et al. |
| 2017/0361678 A1* | 12/2017 | Wagner .............. B60H 1/00849 |

* cited by examiner

VARIABLE COMPRESSOR CONTROL FOR VEHICLE AIR CONDITIONING

FIELD

The subject matter described herein relates in general to vehicle air conditioning systems and, more particularly, to the control of a variable compressor.

BACKGROUND

Vehicles can include air conditioning systems to cool an interior passenger compartment. Such air conditioning systems can cycle a refrigerant fluid through a refrigeration cycle. For example, a compressor can be powered by a vehicle powertrain and used to compress refrigerant vapor to a higher pressure. The compressed refrigerant can be routed through a condenser, where the refrigerant can be cooled. The cooled refrigerant can be routed to an evaporator where the liquid refrigerant evaporates back to a vapor state as the refrigerant receives heat from air blown by a blower. The use of an air conditioning system, including the operation of a compressor, can result in an increased load on a vehicle engine.

SUMMARY

In one respect, the present disclosure is directed to a method of operating a heating, ventilating, and air conditioning (HVAC) system in a vehicle, where the HVAC system includes a variable compressor. The method can include determining whether an engine water temperature meets a forced HVAC recirculation intake threshold, and responsive to determining that the engine water temperature meets the forced HVAC recirculation intake threshold, causing a recirculation mode air source to be selected. Responsive to the recirculation mode air source being selected, the method can include determining if at least one measured vehicle condition meets predetermined criteria. Responsive to determining that the at least one measured vehicle condition meets the predetermined criteria, the method can further include operating the variable compressor according to a reduced duty map.

In another respect, the present disclosure is directed to a method of operating a heating, ventilating, and air conditioning (HVAC) system in a vehicle, wherein the HVAC system including a variable compressor operable based on a first duty map. The method can include causing an intake mode switch to select a recirculation mode air source intake for the HVAC system. The method can further include determining, based on input from a sensor system, whether one or more of the following vehicle conditions are met: a fuel increasing control is on; an engine oil temperature is above a predetermined engine oil temperature value; a transmission oil temperature is above a predetermined transmission oil temperature value; or an exhaust gas temperature is above a predetermined exhaust gas temperature value. Responsive to determining that one or more of the vehicle conditions are met, the method can include operating the variable compressor according to a second duty map, the second duty map having a reduced duty compared to the first duty map for a range of compressor speeds.

In yet another respect, the present disclosure is directed to a vehicle heating, ventilating, and air conditioning (HVAC) system. The system can include a sensor system operable to measure at least on vehicle condition. The system can also include an intake mode switch to select a source of air for the HVAC system. The system can further include a variable compressor configured for variable displacement according to a duty map. The system can include a controller operatively connected to the sensor system and can be programmed to initiate executable operations. The executable operations can include determining whether an engine water temperature meets a forced HVAC recirculation intake threshold. Responsive to determining that the engine water temperature meets the forced HVAC recirculation intake threshold, the operations can include causing the intake mode switch to select a recirculation mode air source. Responsive to the recirculation mode air source being selected, the operations can include determining if at least one measured vehicle condition meets predetermined criteria. Further, responsive to determining that the at least one measured vehicle condition meets the predetermined criteria, the operations can include operating the variable compressor according to a reduced duty map.

DETAILED DESCRIPTION

Figure 1:
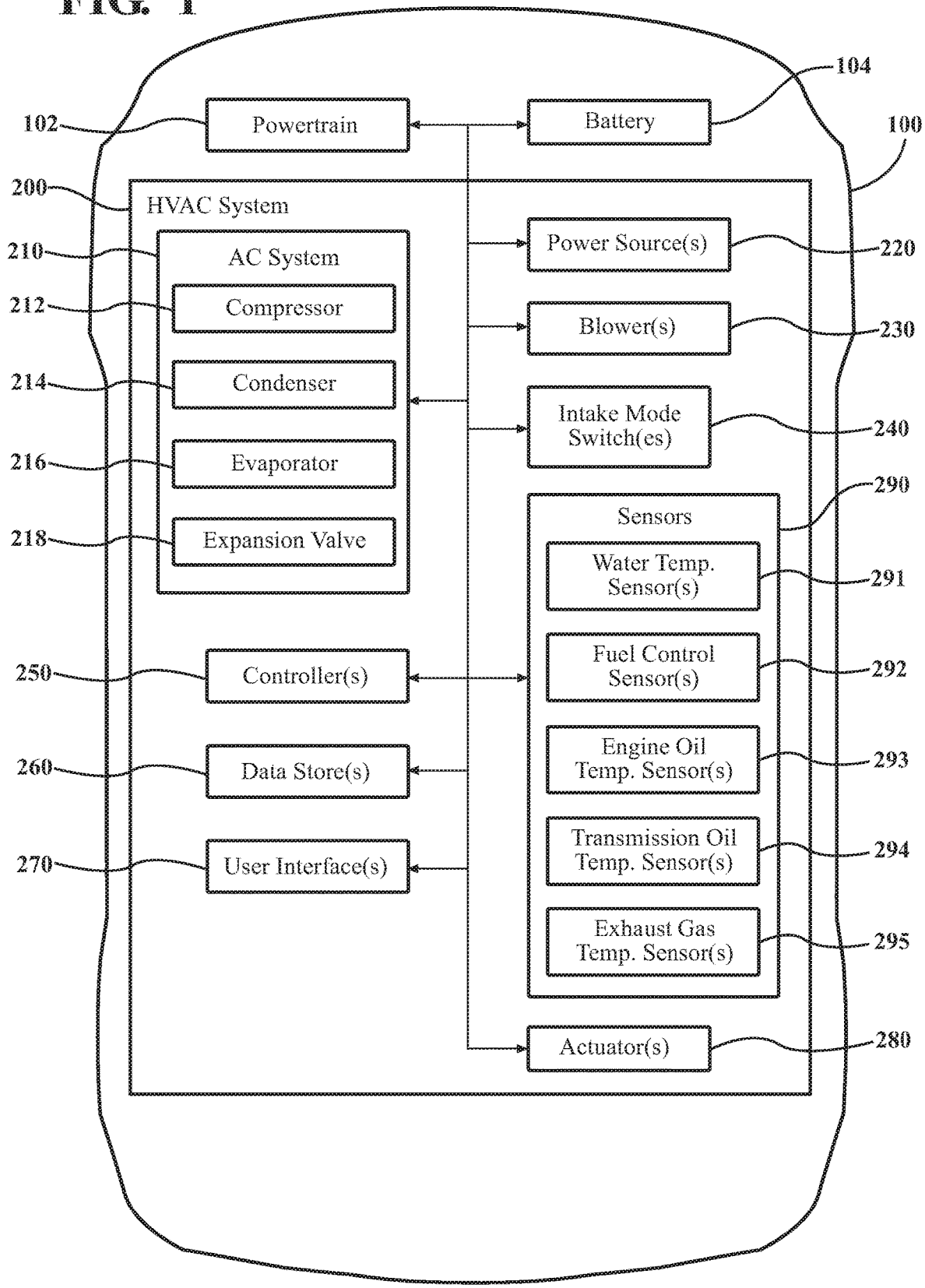
FIG. 1 is an example of a vehicle having a heating, ventilating, and air conditioning system.

This detailed description relates to the operation of vehicle heating, ventilating, and air conditioning (HVAC) systems to reduce a load applied to a vehicle powertrain during certain conditions. The HVAC system can include a variable compressor. Systems and methods can determine if a power state of an HVAC system is activated, and whether an engine water temperature meets a forced HVAC recirculation intake threshold. Responsive to determining that the engine water temperature meets the forced HVAC recirculation intake threshold, a recirculation mode air source can be selected for the HVAC system. Responsive to the recirculation mode air source being selected, it can be determined if at least one measured vehicle condition meets predetermined criteria. As non-limiting examples, the vehicle condition can be a fuel increasing control, an engine oil temperature, a transmission oil temperature, and/or an exhaust gas temperature. Responsive to determining that the at least one measured vehicle condition meets the predetermined criteria, the variable compressor can be operated according to a reduced duty map. The present detailed description relates to systems and methods that incorporate one or more of such features. In at least some instances, such systems and methods can reduce the load applied to a vehicle powertrain during operation of a variable compressor of an HVAC system.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include a powertrain 102 to generate power. As used herein, "powertrain" can include any component or group of components of the vehicle 100 that generates and/or transfers power used by the vehicle 100 for movement. In one or more arrangements, the powertrain 102 can include an engine and an energy source to generate power. The engine can be any suitable type of engine or motor, now known or later developed. For instance, the engine can be an internal combustion engine, an electric motor, a steam engine, and/or a Stirling engine, just to name a few possibilities. In some embodiments, the engine can include a plurality of engine types. For instance, a gas-electric hybrid vehicle can include a gasoline engine and an electric motor.

The energy source can be any suitable source of energy that can be used to at least partially power the engine. The engine can convert energy from the energy source into mechanical energy. Examples of energy sources include gasoline, diesel, propane, hydrogen, other compressed gas-based fuels, ethanol, solar panels, batteries, and/or other sources of electrical power. Alternatively or in addition, the energy source can include fuel tanks, batteries, capacitors, and/or flywheels. In some embodiments, the energy source can be used to provide energy for other systems of the vehicle 100.

The vehicle 100 can include battery 104 to store electrical energy for the vehicle 100. The battery 104 can provide electrical energy to power a variety of vehicle systems. For instance, the battery 104 can power a vehicle ignition system, lights, on-board electronics, as well as any other electronic device connected within the vehicle 100. In one or more arrangements, the battery 104 can be a lead-acid battery including six 2.1 volt cells to provide a nominally 12-volt battery system. The battery 104 can be configured for recharging by an engine of the powertrain 102. In one or more arrangements, the battery 104 can provide an energy source for the powertrain 102.

The vehicle 100 can include a heating, ventilating, and air conditioning (HVAC) system 200. The HVAC system 200 can change the environment or climate of an interior compartment of the vehicle 100. Some of the possible elements of the HVAC system 200 are shown in FIG. 1 and will be described. It will be understood that it is not necessary for the HVAC system 200 to have all of the elements shown in FIG. 1 or described herein. The HVAC system 200 can have any combination of the various elements shown in FIG. 1. Further, the HVAC system 200 can have additional elements to those shown in FIG. 1.

The HVAC system 200 can include an air conditioning (AC) system 210. The AC system 210 can have any configuration to allow for cooling and/or humidity control for at least a portion of the vehicle 100. In one or more arrangements, the AC system 210 can include a refrigerant (not shown), a compressor 212, a condenser 214, an evaporator 216, and/or an expansion valve 218. Further, the AC system 210 can have additional elements to those shown in FIG. 1. In some arrangements, the AC system 210 may not include one or more of the elements shown in FIG. 1. The various elements of the AC system 210 can be arranged in any suitable manner and/or can be operatively connected to each other in any suitable manner.

The compressor 212 can direct or facilitate the movement of refrigerant throughout the AC system 210. In one or more arrangements, the compressor 212 can increase the pressure of the refrigerant vapor, such as by reducing a volume of the vapor. The higher pressure of the refrigerant vapor can increase the temperature of the refrigerant.

The compressor 212 can have any suitable configuration for the AC system 210. As non-limiting examples, the compressor 212 can include a rotary compressor, a reciprocating compressor, a centrifugal compressor, and/or an axial compressor. The compressor 212 can be powered by any suitable power source within the vehicle 100. In one or more arrangements, the compressor 212 can be powered by the powertrain 102. For example, a belt can be used to transfer rotational energy from the engine to the compressor 212. Alternatively or in addition, the compressor 212 can be powered by an electric motor powered by the battery 104.

In one or more arrangements, the compressor 212 can be a variable compressor. As used herein, "variable compressor" or "variable displacement compressor" can include any compressor configured to vary its duty over time. As used herein, "duty" can include any representation of a compressor's pumping capacity. For example, a duty can be correlated to a displacement of a variable compressor. In some arrangements, a variable compressor can change a displacement volume of fluid. For example, a variable compressor might have a displacement variable from about 80 cubic centimeters ($cm^3$) to about 120 $cm^3$.

Figure 5:
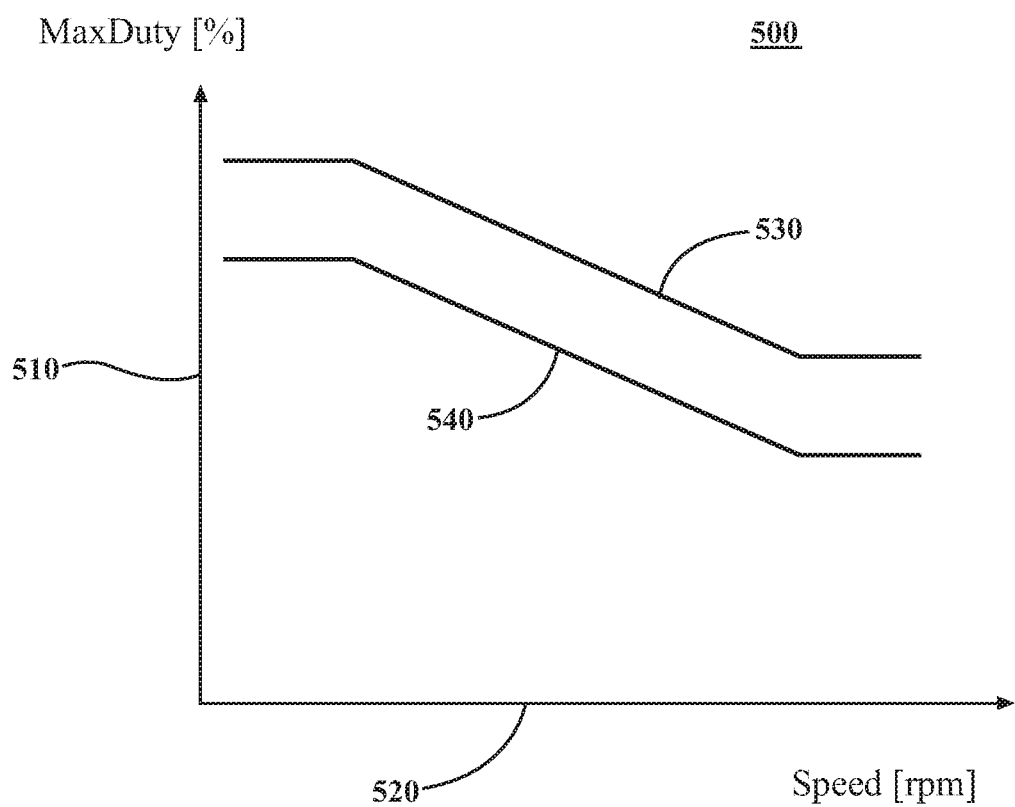
FIG. 5 is an example graph showing a first and second duty map for a variable compressor.

In one or more arrangements, the compressor 212 can vary a duty over time according to a duty map. As used herein, "duty map" can include functions of a duty based on compressor speed. For instance, a duty map can control the displacement of the compressor 212 as a function of compressor speed. FIG. 5, as discussed below, provides examples of duty maps used to operate the compressor 212.

The condenser 214 can cool and condense the refrigerant to a liquid state. The condenser 214 can have any suitable configuration for the AC system 210. In one or more arrangements, the condenser 214 be any form of a heat exchanger. For example, the condenser 214 can include coiled tubing. In some arrangements, fins can be connected to the tubing to increase a surface area of a material that is in contact with the refrigerant. In one or more arrangements, the condenser 214 can allow a fluid, such as air, to be directed through the condenser 214. For example, a fan can be operated in close proximity to the condenser to blow air across the coils and/or fins.

The evaporator 216 can allow and/or cause the transition of a refrigerant from a liquid state to a gaseous state. The evaporator 216 can allow heat transfer between the refrigerant and air surrounding the evaporator 216. In one or more arrangements, the evaporator 216 can include coiled tubes for the refrigerant to be routed through. Hotter air can be blown across the evaporator 216. In one or more arrangements, the air moving across the evaporator 216 heats the refrigerant to a warmer temperature and ultimately evaporates the refrigerant from a liquid state to a gaseous state. The air being blown across the evaporator 216 can be cooled and routed into the passenger compartment of the vehicle 100.

In one or more arrangements, the evaporator 216 can collect condensation at exterior surfaces during the operation of AC system 210. For instance, as the refrigerant cools within the evaporator 216, moisture from air around the evaporator 216 can condense on the exterior surface(s) of the evaporator 216.

The expansion valve 218 can facilitate change in pressures of the refrigerant. For instance, the expansion valve 218 can be located between the condenser 214 and the evaporator 216. In one or more arrangements, the expansion valve 218 can allow the liquid refrigerant to undergo an abrupt decrease in pressure and decrease in temperature as the refrigerant moves from the condenser 214 to the evaporator 216.

The HVAC system 200 can include one or more power sources 220 to provide mechanical or electrical power to one or more elements of the HVAC system 200. In one or more arrangements, the power source(s) 220 can include the battery 104. Alternatively or in addition, the power source(s) 220 can include other power sources. For example, the power source(s) 220 can include additional batteries and/or generators.

The HVAC system 200 can include one or more blowers 230 to direct and/or cause the movement of air or other fluid/gas. As used herein, "air" can include any gaseous fluid. For example, air can include environmental gas in and/or around the vehicle 100. The blower(s) 230 can direct and/or cause the movement of air into a passenger compartment of the vehicle 100. In one or more arrangements, the blower(s) 230 can move air across the evaporator 216 when the AC system 210 is being operated. In one or more arrangements, the blower(s) 230 can include a blower motor and one or more fans to move a quantity of air past the evaporator 216 and through air ducts into the passenger compartment of the vehicle 100. For instance, the blower(s) 230 can direct air over tubing and/or coils of the evaporator 216 to allow the refrigerant flowing through the evaporator 216 to remove heat from the air. In one or more arrangements, the blower(s) 230 can be powered by the powertrain 102, the battery 104, and/or the power source(s) 220.

The HVAC system 200 can include one or more intake mode switches 240 to control the source of air being introduced to the HVAC system 200 and/or the vehicle 100. In one or more arrangements, the intake mode switch(es) 240 can allow the selection of a source of air being introduced to the blower(s) 230. For instance, the source of air can be outside of a passenger compartment and/or outside of the vehicle 100, referred to as "fresh mode air source". Additionally, the source of air can be within the passenger compartment, referred to as "recirculation mode air source." In one or more arrangements, the intake mode switch(es) 240 can be operated to change the air source selection between a fresh mode air source, a recirculation mode air source, and/or a mix of both modes.

The HVAC system 200 can include one or more controllers 250. "Controller" means any component or group of components that are configured to execute any of the processes described herein or any form of instructions to carry out such processes or cause such processes to be performed. The controller(s) 250 may be implemented with one or more general-purpose and/or one or more special-purpose processors. Examples of suitable controllers include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a processor. The controller(s) 250 can include at least one hardware circuit (e.g., an integrated circuit) configured to carry out instructions contained in program code. In arrangements in which there is a plurality of controllers 250, such controllers can work independently from each other or one or more controllers can work in combination with each other.

The controller 250 can cause, directly or indirectly, one or more elements of the HVAC system 200 to be activated or deactivated. As used herein, "cause" or "causing" means to make, force, compel, direct, command, instruct, and/or enable an event or action to occur or at least be in a state where such event or action may occur, either in a direct or indirect manner. In one or more arrangements, the controller(s) 250 can be an HVAC electronic control unit (ECU). In one or more arrangements, the controller 250 can cause, directly or indirectly, a change in the duty, or displacement, of the compressor 212.

The HVAC system 200 can include one or more data stores 260 for storing one or more types of data. The data store 260 can include volatile and/or non-volatile memory. Examples of suitable data stores 260 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 260 can be a component of the controller(s) 250, or the data store 260 can be operatively connected to the controller(s) 250 for use thereby. The term "operatively connected," as used throughout this description, can include direct or indirect connections, including connections without direct physical contact. In one or more arrangements, the data store(s) 260 can include instructions to allow the controller 250 to operate one or more elements of the HVAC system 200.

The HVAC system 200 can include one or more user interface(s) 270. In one or more arrangements, the user interface(s) 270 can include an input system and/or an output system. An "input system" includes any device, component, system, element or arrangement or groups thereof that enable information/data to be entered into a machine. The input system can receive an input from a vehicle occupant (e.g. a driver or a passenger). Any suitable input system can be used, including, for example, a keypad, display, touch screen, multi-touch screen, button, joystick, mouse, trackball, microphone and/or combinations thereof. An "output system" includes any device, component, system, element or arrangement or groups thereof that enable information/data to be presented to a vehicle occupant (e.g. a person, a vehicle occupant, etc.). The output system can present information/data to a vehicle occupant. The output system can include a display. Alternatively or in addition, the output system may include a microphone, earphone and/or speaker. Some components of the vehicle 100 may serve as both a component of the input system and a component of the output system. In one or more arrangements, the user interface(s) 270 can include a vehicle head unit.

The vehicle 100 can include one or more actuators 280. The actuators 280 can be any element or combination of elements operable to modify, adjust and/or alter one or more components of the HVAC system 200 and/or the vehicle 100 responsive to receiving signals or other inputs from the controller(s) 250. Any suitable actuator can be used. For instance, the one or more actuators 280 can include motors, pneumatic actuators, hydraulic pistons, relays, solenoids, and/or piezoelectric actuators, just to name a few possibilities.

The HVAC system 200 can include one or more sensors 290. "Sensor" means any device, component and/or system that can detect, determine, assess, monitor, measure, quantify and/or sense something. The one or more sensors can detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which there are a plurality of sensors 290, the sensors can work independently from each other. Alternatively, two or more of the sensors can work in combination with each other. In such case, the two or more sensors can form a sensor network. The sensors 290 can be operatively connected to the controller(s) 250, the data store(s) 260, and/or other element of the HVAC system 200 (including any of the elements shown in FIG. 1). The sensors 290 can include any suitable type of sensor. Various examples of different types of sensors will be described herein. However, it will be understood that the embodiments are not limited to the particular sensors described.

The sensors 290 can include one or more water temperature sensors 291. The water temperature sensor(s) 291 can sense a temperature of an engine cooling water, also known as a long life coolant (LLC). As used herein, "engine water" or "engine cooling water" includes any fluid used for the cooling of one or more components of an engine of the vehicle 100. For example, engine water can include water, antifreeze, anti-corrosive fluids, glycol, and/or mixtures thereof. The water temperature sensor(s) 291 can be any suitable sensor. For example, the water temperature sensor(s) 291 can include a mechanical thermometer, a bimetal sensor, a thermistor, a thermocouple, a resistance thermometer, and/or a silicon bandgap sensor. In one or more arrangements, the water temperature sensor(s) 291 can be at least partially located within, on, or proximate to a vehicle engine.

The sensors 290 can include one or more fuel control sensors 292. The fuel control sensor(s) 292 sense whether an energy source, such as a fuel, is being introduced to an engine. Further, the fuel control sensor(s) 292 can sense whether an amount of fuel being introduced to an engine is increasing. In some arrangements, the fuel control sensors 292 can determine whether a fuel increasing control is on or off. As used herein, "fuel increasing control" can include conditions in which additional fuel is being introduced to an engine to assist in cooling one or more components of the vehicle 100.

The sensors 290 can include one or more engine oil temperature sensors 293. The engine oil temperature sensor(s) 293 can sense a temperature of an engine oil. The engine oil temperature sensor(s) 293 can be any suitable sensor that can sense an engine oil temperature. For example, the engine oil temperature sensor(s) 293 can include a mechanical thermometer, a bimetal sensor, a thermistor, a thermocouple, a resistance thermometer, and/or a silicon bandgap sensor. In one or more arrangements, the engine oil temperature sensor(s) 293 can be at least partially located within, on, or proximate to a vehicle engine. For example, the engine oil temperature sensor(s) 293 can be located within an oil pan of an engine of vehicle 100.

The sensors 290 can include one or more transmission oil temperature sensors 294. The transmission oil temperature sensor(s) 294 can sense a temperature of a transmission oil. The transmission oil temperature sensor(s) 294 can be any suitable sensor that can sense a transmission oil temperature. For example, the transmission oil temperature sensor(s) 294 can include a mechanical thermometer, a bimetal sensor, a thermistor, a thermocouple, a resistance thermometer, and/or a silicon bandgap sensor. In one or more arrangements, the transmission oil temperature sensor(s) 294 can be at least partially located within, on, or proximate to one or more components of a vehicle transmission.

The sensors 290 can include one or more exhaust gas temperature sensors 295. The exhaust gas temperature sensor(s) 295 can sense a temperature of an exhaust gas of the vehicle 100. The exhaust gas temperature sensor(s) 295 can be any suitable sensor that can sense an exhaust gas temperature. For example, the exhaust gas temperature sensor(s) 295 can include a mechanical thermometer, a bimetal sensor, a thermistor, a thermocouple, a resistance thermometer, and/or a silicon bandgap sensor. In one or more arrangements, the exhaust gas temperature sensor(s) 295 can be at least partially located within, on, or proximate to one or more components of a vehicle exhaust system. For example, the exhaust gas temperature sensor(s) 295 can be located within an exhaust manifold of an engine of the vehicle 100.

Figure 2:
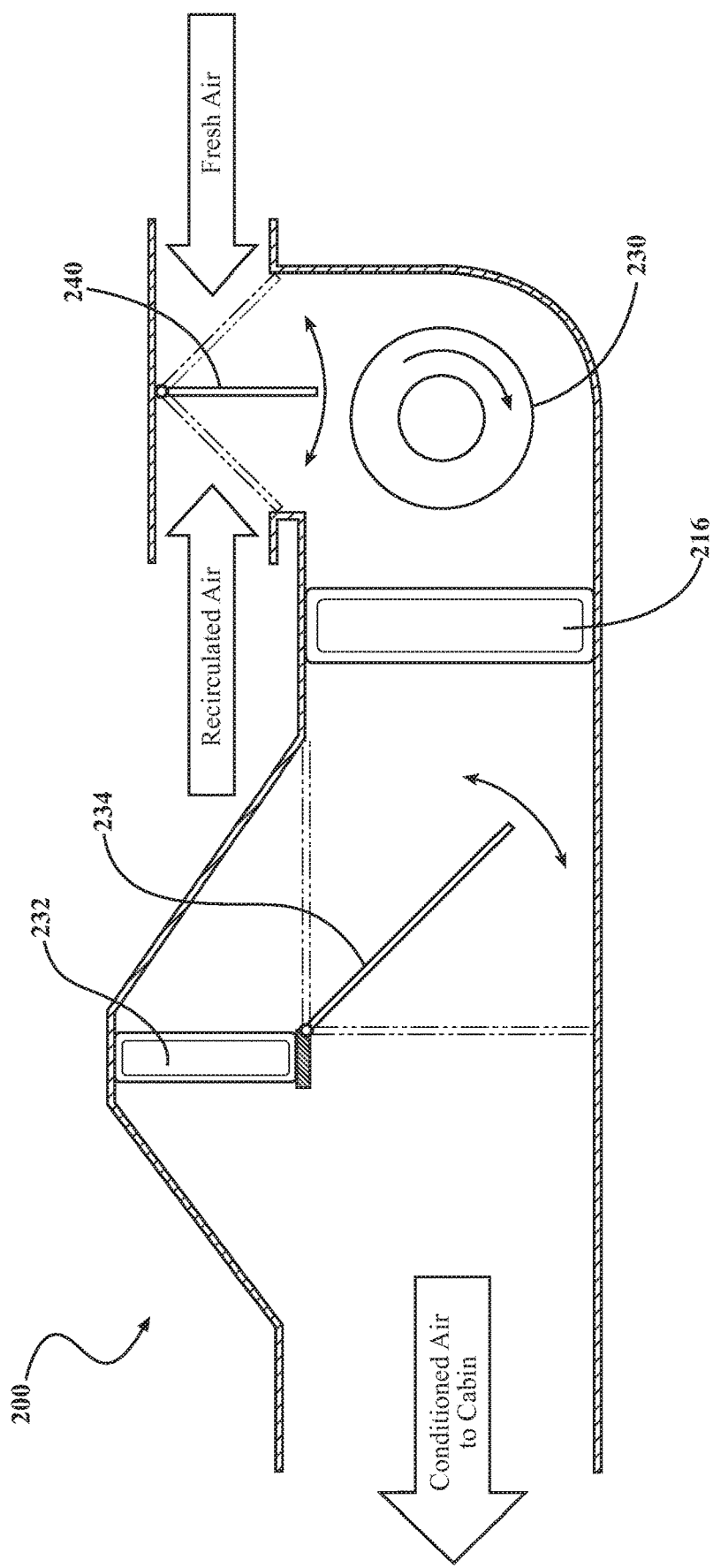
FIG. 2 is an example of a heating, ventilating, and air conditioning system.

Referring now to FIG. 2, a portion of the HVAC system 200 can be shown. In one or more arrangements, the intake mode switch 240 can move to allow recirculated air and/or fresh air into the system. For example, the intake mode switch 240 can include a door that is movable between a first position that allows only fresh air to the blower 230, and a second position that allows only recirculated air to the blower 230. In one or more arrangements, the blower 230 can be activated to move air towards and through the evaporator 216. In one or more arrangements, the HVAC system 200 can include a heater core 232 to heat air traveling to the interior of the vehicle 100. An air mix door 234 can be included in the HVAC system 200 to direct air towards or away from the heater core 232.

Figure 3:
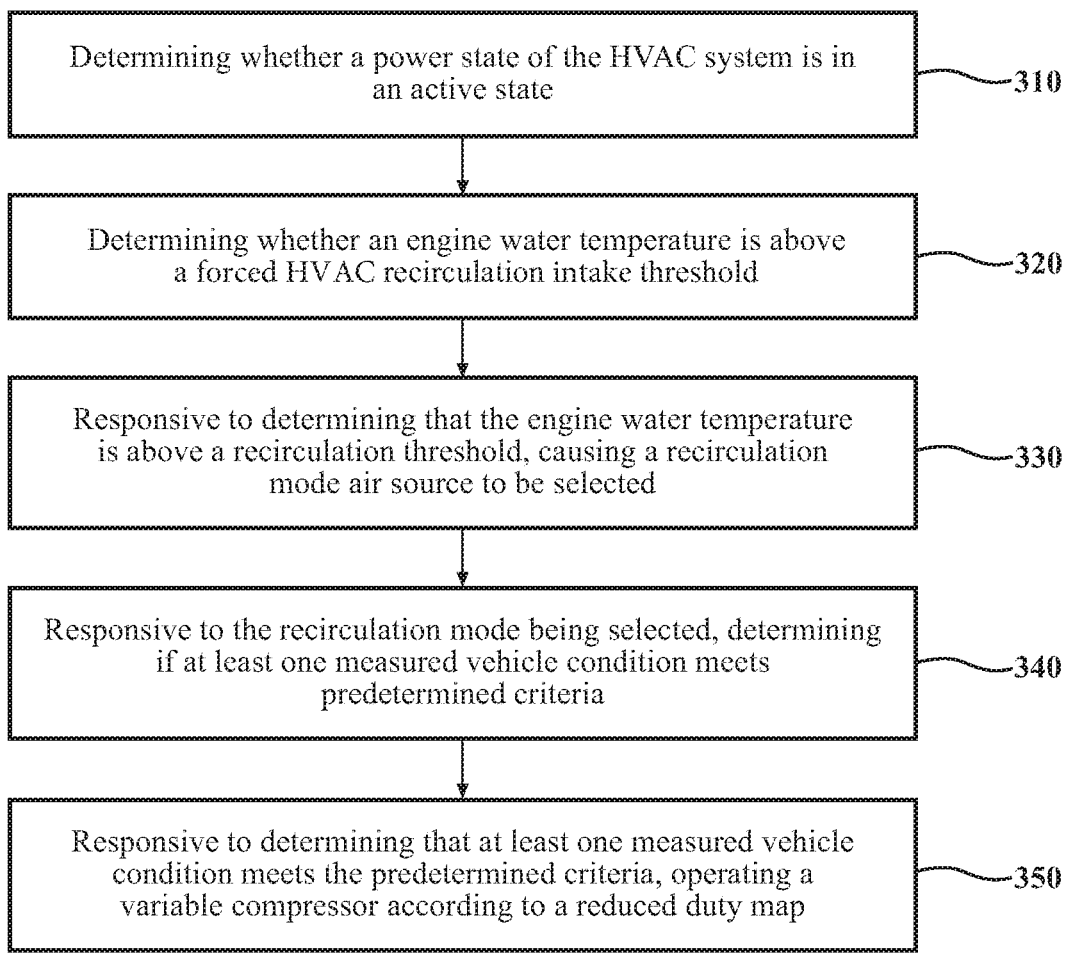
FIG. 3 is a first example of a method of operating a heating, ventilating, and air conditioning system having a variable compressor.

Now that the various potential systems, devices, elements and/or components of the vehicle 100 have been described, various methods to operate an HVAC system will now be described. Referring now to FIG. 3, a first example of a method of operating an HVAC system is shown. Various possible steps of method 300 will now be described. The method 300 illustrated in FIG. 3 may be applicable to the embodiments described above in relation to FIGS. 1 and 2, but it is understood that the method 300 can be carried out with other suitable systems and arrangements. Moreover, the method 300 may include other steps that are not shown here, and in fact, the method 300 is not limited to including every step shown in FIG. 3. The steps that are illustrated here as part of the method 300 are not limited to this particular chronological order. Indeed, some of the steps may be performed in a different order than what is shown and/or at least some of the steps shown can occur simultaneously.

At block 310, it can be determined whether a power state of the HVAC system 200 is in an active state. As used herein, "active state" can include any conditions in which one or more components of the HVAC system 200 is operable to change conditions within the vehicle 100. For example, the active state can include conditions in which the compressor 212 is active. Alternatively or in addition, one or more of the sensors 290 that are operatively connected to the controller(s) 250 can determine if the HVAC system 200 is in an active state. In some arrangements, the determining can be done by the controller(s) 250. If it is determined that the HVAC system 200 is in an active state the method 300 can continue to block 320.

At block 320, it can be determined whether an engine water temperature meets a forced HVAC recirculation intake threshold. The determination can include determining whether the engine water temperature is substantially equal to and/or greater than a predetermined value. In some arrangements, the determination can be done by the controller(s) 250. Further, the determination can be based on information received by the water temperature sensor(s) 291. The forced HVAC recirculation intake threshold can be a fixed value or a range of values. Alternatively or in addition, the forced HVAC recirculation intake threshold can vary over time. For example, the forced HVAC recirculation intake threshold can vary based on one or more environmental or vehicular conditions, such as an ambient temperature, ambient humidity, ambient pressure, vehicle speed, and/or vehicle location just to name a few possibilities. The method 300 can continue to block 330.

At block 330, responsive to determining that the engine water temperature meets the forced HVAC recirculation intake threshold, a recirculation mode air source can be selected for the HVAC system 200. In one or more arrangements, such switching can be accomplished by, for example, using the intake mode switch(es) 240. For instance, if the intake mode switch(es) 240 were set to a fresh mode air source, the intake mode switch(es) 240 can be switched to the recirculation mode air source. Further, if the intake mode switch(es) 240 were set in the recirculation mode air source, no action is taken. In some arrangements, the controller 250 can control the intake mode switch(es) 240 via the one or more actuators 280. The switching can occur at any suitable time after it is determined the engine water temperature meets the forced HVAC recirculation intake threshold. After the HVAC intake mode is switched to a recirculation mode air source, the method 300 can continue to block 340.

At block 340, responsive to the recirculation mode being selected, it can be determined whether at least one measured vehicle condition meets predetermined criteria. In one or more arrangements, measured vehicle conditions include information detected by the sensors 290. In some arrangements, the predetermined criteria can be stored in the data store(s) 260. The controller(s) 250 can compare information received from the sensors 290 with the predetermined criteria stored in the data store(s) 260 to determine whether the at least one measured vehicle condition meets the predetermined criteria. Examples of measured vehicle conditions will now be discussed.

In one or more arrangements, a measured vehicle condition can include whether a fuel increasing control is on or off. The predetermined criteria can be met when the fuel increasing control is on. In one or more arrangements, the controller 250 can receive a fuel increasing control signal from the fuel control sensor(s) 292.

In one or more arrangements, the measured vehicle condition can include an engine oil temperature. The predetermined criteria can be met when the engine oil temperature is equal to and/or above a predetermined engine oil temperature value. In one or more arrangements, the predetermined engine oil temperature value can be stored in the data store(s) 260. In one or more arrangements, the controller 250 can receive an engine oil temperature signal from the engine oil temperature sensor(s) 293. The controller(s) 250 can compare the received engine oil temperature to the predetermined engine oil temperature value. The predetermined engine oil temperature value can be a fixed value or a range of values. Alternatively or in addition, the predetermined engine oil temperature value can vary over time.

In one or more arrangements, the measured vehicle condition can include a transmission oil temperature. The predetermined criteria can be met when the transmission oil temperature is equal to and/or above a predetermined transmission oil temperature value. In one or more arrangements, the predetermined transmission oil temperature value can be stored in the data store(s) 260. In one or more arrangements, the controller 250 can receive a transmission oil temperature signal from the transmission oil temperature sensor(s) 294. The controller(s) 250 can compare the received transmission oil temperature to the predetermined transmission oil temperature value. The predetermined transmission oil temperature value can be a fixed value or a range of values. Alternatively or in addition, the predetermined transmission oil temperature value can vary over time.

In one or more arrangements, the measured vehicle condition can include an exhaust gas temperature. In some arrangements, the predetermined criteria is met when the exhaust gas temperature is equal to and/or above a predetermined exhaust gas temperature value. In one or more arrangements, the predetermined exhaust gas temperature value can be stored in the data store(s) 260. In one or more arrangements, the controller 250 can receive an exhaust gas temperature signal from the exhaust gas temperature sensor(s) 295. The controller(s) 250 can compare the received exhaust gas temperature to the predetermined exhaust gas temperature value. The predetermined exhaust gas temperature value can be a fixed value or a range of values. Alternatively or in addition, the predetermined exhaust gas temperature value can vary over time.

If it is determined that at least one measured vehicle condition, such as one of those listed above, meets the predetermined criteria, the method 300 can continue to block 350. At block 350, responsive to determining that at least one measured vehicle condition meets the predetermined criteria, a variable compressor can be operated according to a reduced duty map. The variable compressor can be the compressor 212 and can be operated at least in part by the controller(s) 250. As shown in FIG. 5 below, the compressor 212 can be operated according to a second duty map 540, which is a reduced duty map compared to a first duty map 530. As explained further below, the second duty map 540 can have a reduced max duty for different speeds of the compressor 212. The method 300 can end. Alternatively, the method 300 can return to block 310.

Figure 4:
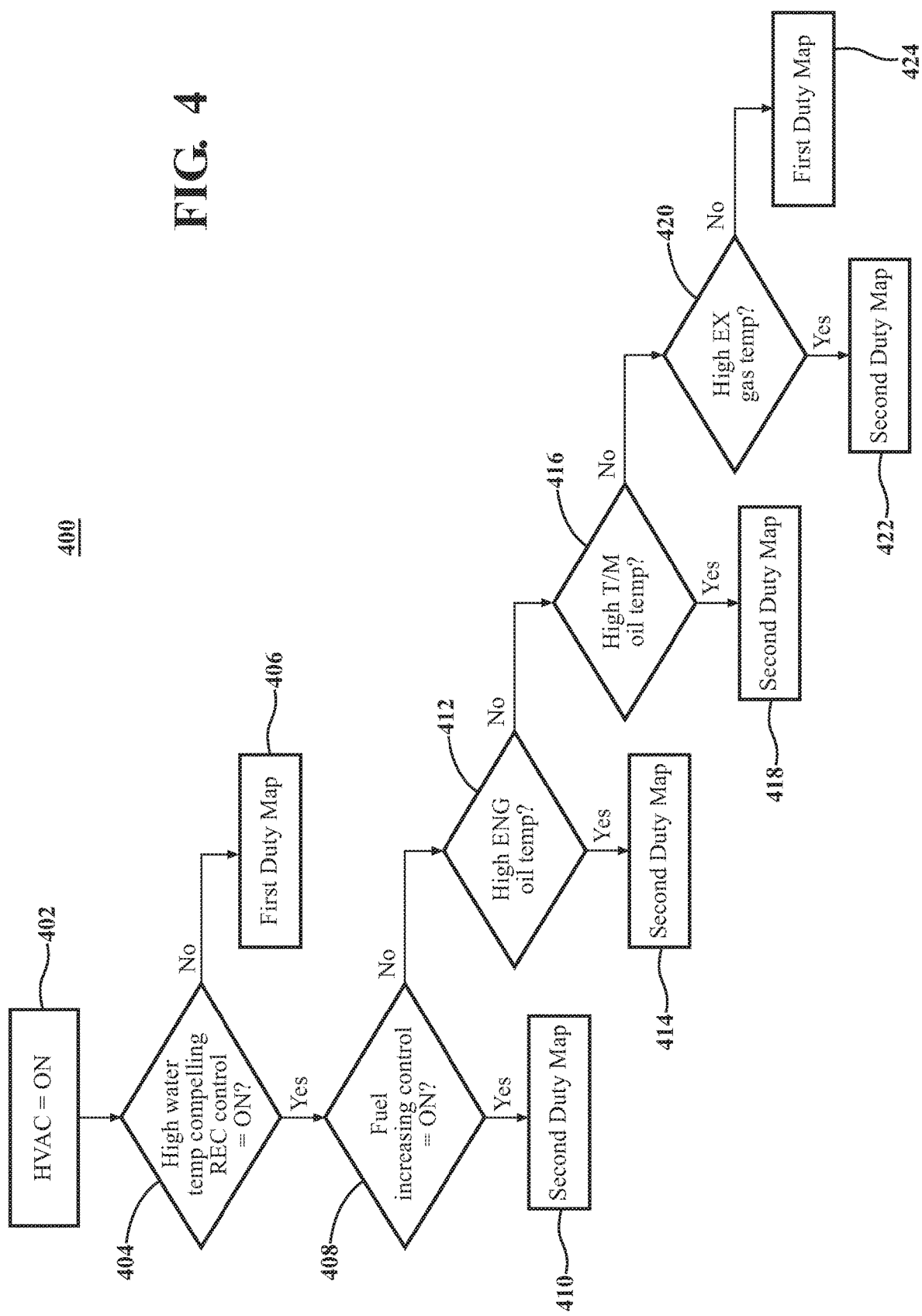
FIG. 4 is a second example of a method of operating a heating, ventilating, and air conditioning system having a variable compressor.

Referring now to FIG. 4, another non-limiting example of a method 400 of operating an HVAC system will now be described. The method 400 illustrated in FIG. 4 may be applicable to the embodiments described above in relation to FIGS. 1-3, but it is understood that the method 400 can be carried out with other suitable systems and arrangements. Moreover, the method 400 may include other steps that are not shown here, and in fact, the method 400 is not limited to including every step shown in FIG. 4. The steps that are illustrated here as part of the method 400 are not limited to this particular chronological order. Indeed, some of the steps may be performed in a different order than what is shown and/or at least some of the steps shown can occur simultaneously.

At block 402, the HVAC can be activated. For example, the HVAC system 200 can be operated such that the compressor 212 is in operation. The method can continue to block 404.

At block 404, it is determined whether a recirculation mode air source control is activated based on a high engine water temperature. In some arrangements, the recirculation mode air source control is activated if it is determined that an engine water temperature meets a forced HVAC recirculation intake threshold.

If it is determined that a recirculation mode air source is not controlled based on a high engine water temperature, the method can continue to block 406. At block 406, the compressor can be operated according to a first duty map. For example, the compressor 212 can be operated at the first duty map 530 shown in FIG. 5.

If it is determined that the recirculation mode air source control is activated based on a high engine water temperature, the method 400 can continue to block 408. At block 408, it can be determined if a fuel increasing control is on. If it is determined that the fuel increasing control is on, the compressor can be operated according to a reduced duty map (block 410). For example, the compressor 212 can be operated at the second duty map 540 shown in FIG. 5. If it is determined that the fuel increasing control is not on, the method 400 can continue to block 412.

At block 412, it can be determined if a high engine oil temperature is detected. In one or more arrangements, a high engine oil temperature can be detected if an engine oil temperature is above a predetermined engine oil temperature value. If it is determined that a high engine oil temperature is detected, the compressor can be operated according to a reduced duty map (block 414). For example, the compressor 212 can be operated at the second duty map 540 shown in FIG. 5. If it is determined that a high engine oil temperature is not detected, the method 400 can continue to block 416.

At block 416, it can be determined if a high transmission oil temperature is detected. In one or more arrangements, a high transmission oil temperature can be detected if a transmission oil temperature is above a predetermined transmission oil temperature value. If it is determined that a high transmission oil temperature is detected, the compressor can be operated according to a reduced duty map (block 418). For example, the compressor 212 can be operated at the second duty map 540 shown in FIG. 5. If it is determined that a high transmission oil temperature is not detected, the method 400 can continue to block 420.

At block 420, it can be determined if a high exhaust gas temperature is detected. In one or more arrangements, a high exhaust gas temperature can be detected if an exhaust gas temperature is above a predetermined exhaust gas temperature value. If it is determined that a high exhaust gas temperature is detected, the compressor can be operated according to a reduced duty map (block 422). For example, the compressor 212 can be operated at the second duty map 540 shown in FIG. 5. If it is determined that a high exhaust gas temperature is not detected, the compressor can be operated according to a normal duty map. For example, the compressor 212 can be operated at the first duty map 530 shown in FIG. 5. The method 400 can end. Alternatively, the method 400 can return to block 402.

As mentioned above, FIG. 5 shows a graph 500 of max duty as a function of compressor speed. For example, a max duty percentage 510 can be plotted based on a compressor speed 520 measured in rotations per minute (rpm). In one or more arrangements, the compressor speed 520 is directly depended on a speed of a vehicle engine. For example, the compressor speed 520 can be coupled to an engine crankshaft with a constant pulley ratio.

In one or more arrangements, one or more duty maps can be used to control the compressor 212. For instance, the first duty map 530 and the second duty map 540 can be used and are shown in graph 500. In some arrangements, the first duty map 530 can represent a normal or default duty map for compressor 212. At low speeds, a high max duty can be used. At high speeds, a lower max duty can be used. A max duty can decrease linearly between the low speeds and the high speeds.

In one or more arrangements, the second duty map 540 can have a reduced max duty for one or more speeds of the compressor as compared to the first duty map 530. For example, the second duty map 540 can be offset a substantially similar amount across all speeds of the compressor 212 from the first duty map 530.

While two duty maps are shown in FIG. 5, it is to be appreciate that more duty maps can be used to control the compressor 212. For example, a third duty map, which includes reduced max duties relative to the second duty map 540, can be used to operate the compressor 212. In one or more arrangements, the third duty map can be used to operate the compressor 212 when two or more measured vehicle conditions meet predetermined criteria. Alternatively or in addition, the third duty map can be used to operate the compressor 212 when at least one measured vehicle condition meets additional predetermined criteria.

It will be appreciated that arrangements described herein can provide numerous benefits, including one or more of the benefits mentioned herein. Arrangements described herein can reduce required engine torque for a vehicle HVAC system. For example, during certain conditions, a compressor can be operated according to a reduced duty map that reduces the load on an engine. This can reduce heat rejection from the condenser during certain conditions. Arrangements can reduce required engine torque, engine water temperature, and exhaust gas temperature. This can lead to the reduction of heat damage to parts surrounding exhaust components, increased tow capacity through lower engine temperatures, and the reduction of fuel consumption. Such arrangements can be especially useful for turbo-charged engines, as they have increased heat load at high engine load and require additional cooling capacity. Arrangements described herein can eliminate or reduce additional cooling heat exchanges, which can improve packaging and safety (such as in small overlap and pedestrian impact conditions).

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of operating a heating, ventilating, and air conditioning (HVAC) system in a vehicle, the HVAC system including a variable compressor, the method sequentially comprising:
   determining whether an engine water temperature is greater than or equal to a forced HVAC recirculation intake threshold;
   responsive to determining that the engine water temperature is greater than or equal to the forced HVAC recirculation intake threshold, causing a recirculation mode air source to be selected without interrupting the operation of the variable compressor;
   responsive to recirculation mode air source being selected, determining whether a fuel increasing control is on;
   responsive to determining that the fuel increasing control is on, operating the variable compressor according to a reduced duty map, the reduced duty map including the variable compressor in an active state;
   responsive to determining that the fuel increasing control is not on, determining whether the following vehicle conditions are met:
      an engine oil temperature is above a predetermined engine oil temperature value;
      a transmission oil temperature is above a predetermined transmission oil temperature value; and
      an exhaust gas temperature is above a predetermined exhaust gas temperature value;
   responsive to determining that at least one of the vehicle conditions is met, operating the variable compressor according to the reduced duty map; and
   responsive to determining that none of the vehicle conditions are met, operating the variable compressor according to a normal duty map.

2. The method of claim 1, wherein the reduced duty map includes lower max duties for a range of speeds of the variable compressor.

3. A vehicle heating, ventilating, and air conditioning (HVAC) system comprising:
   a sensor system, the sensor system including a fuel control sensor, an engine oil temperature sensor, a transmission oil temperature sensor, and an exhaust gas temperature sensor;
   an intake mode switch to select a source of air for an intake for the HVAC system;
   a variable compressor configured for variable displacement according to a first duty map;
   a controller operatively connected to the sensor system, the controller being programmed to initiate executable operations sequentially comprising:
      determining whether an engine water temperature is greater than or equal to a forced HVAC recirculation intake threshold;
      responsive to determining that the engine water temperature is greater than or equal to the forced HVAC recirculation threshold, causing the intake mode switch to select a recirculation mode air source without interrupting the operation of the variable compressor;

responsive to the recirculation mode air source being selected, determining whether a fuel increasing control is on;

responsive to determining that the fuel increasing control is on, operating the variable compressor according to a reduced duty map, the reduced duty map including the variable compressor in an active state;

responsive to determining that the fuel increasing control is not on, determining whether the following vehicle conditions are met:

an engine oil temperature is greater than a predetermined engine oil temperature value;

a transmission oil temperature is greater than a predetermined transmission oil temperature value; and an exhaust gas temperature is greater than a predetermined exhaust gas temperature value;

responsive to determining that at least one of the vehicle conditions is met, operating the variable compressor according to the reduced duty map; and responsive to determining that none of the vehicle conditions are met, operating the variable compressor according to the first duty map.

4. The system of claim 3, wherein the reduced duty map includes lower max duties for a range of speeds of the variable compressor.

* * * * *